June 7, 1932.     R. E. BOSCHERT     1,861,468
HYDRAULIC BALING PRESS
Filed Feb. 4, 1929     2 Sheets-Sheet 1
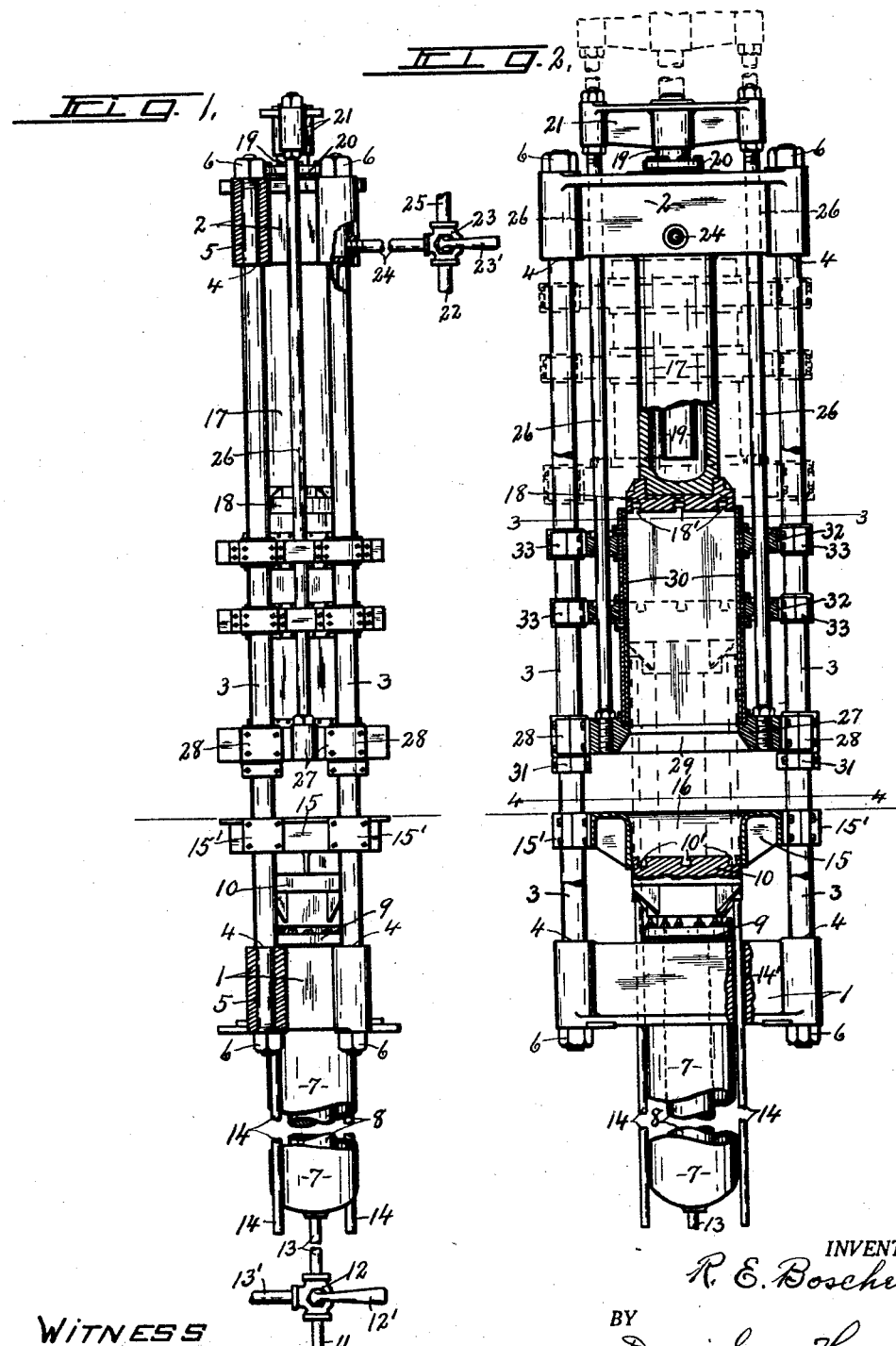
INVENTOR.
R. E. Boschert
BY
Denison & Thompson
ATTORNEYS
WITNESS
J. J. Mains

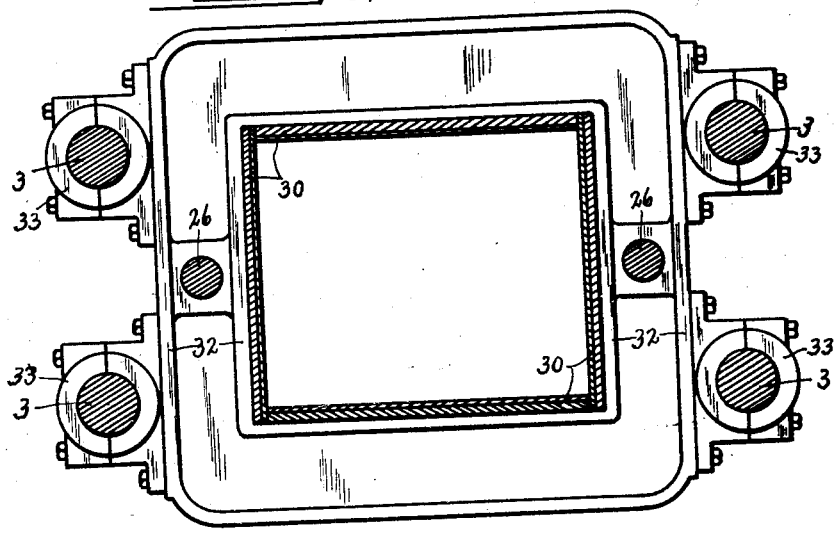
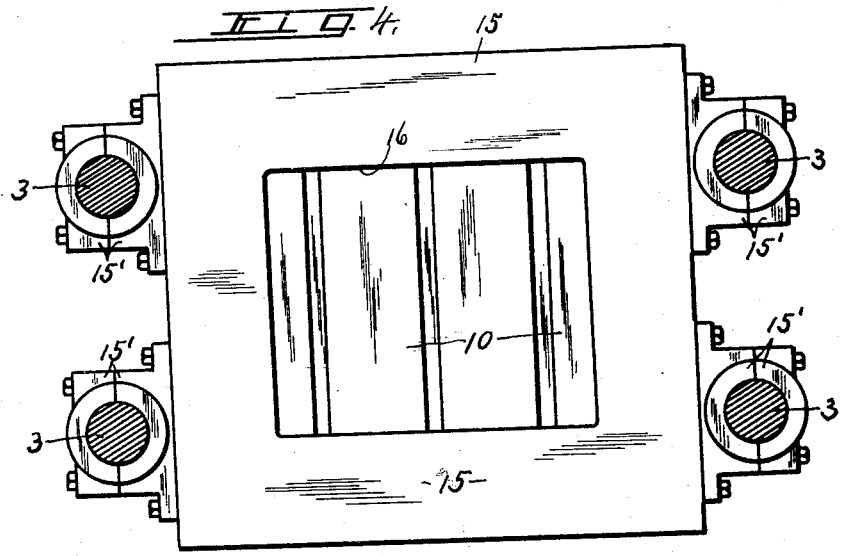

Patented June 7, 1932

1,861,468

UNITED STATES PATENT OFFICE

RUFUS E. BOSCHERT, OF SYRACUSE, NEW YORK

HYDRAULIC BALING PRESS

Application filed February 4, 1929. Serial No. 337,399.

This invention relates to a hydraulic baling-press adapted to be used more particularly for re-pressing pre-formed bales of pulp or other compressible materials which have been previously pressed more or less loosely into bale form by presses of relatively light construction and limited power, but obviously it may be used for the initial baling of such materials.

These bales are usually pressed in sectional forms or molds, commonly known as baling boxes, having its sections relatively movable for the reception and discharge of the bales but this opening and closing of the sections involves the expenditure of considerable time and labor and resultant relatively low output for a given period of time.

Furthermore, it is well known that the cost of transportation and storage of practically all materials is based not only upon the weight but also upon the size or bulk of such materials and the main object of the present invention is to provide a simple, compact and sturdy baling press of relatively high power by which the bales may be formed or reformed under maximum compression with greater speed and accuracy and with less labor than has heretofore been practiced.

One of the specific objects is to assemble all parts of the baling box in rigid and permanent relation and to provide means for moving the box endwise upon and from the bale a sufficient distance to enclose the bale during the pressing operation and to uncover the same from end to end for binding and removal immediately following the pressing operation.

Another object is to provide means whereby the pre-formed bale may be temporarily supported endwise vertically against lateral displacement while the baling box is being lowered to its pressing position around the bale preparatory to further compression of the latter.

A further object is to hold the pressing elements in their pressing position with the compressed bales between them until the box is entirely withdrawn from the bale and to provide the faces of said elements with grooves through which the binders may be conveniently passed and fastened to hold the bale in its compressed condition so that the bound bale may be removed laterally from the press immediately following the recession of one of said elements.

Another object is to install the press in an upright position for economy in floor space and also to facilitate the various operations of the press and the placing and removal of the bales in and from the press.

Other objects and uses relating to specific parts of the machine will be brought out in the following description.

In the drawings, Figures 1 and 2 are respectively a side elevation and a front elevation, both partly broken away, and partly in section, of an upright hydraulic press showing the various structures of my invention.

Figures 3 and 4 are enlarged horizontal sections, taken respectively in the planes of lines 3—3 and 4—4 of Figure 2.

The frame of the press comprises lower and upper heads arranged in parallel spaced relation and connected by tie-rods —3— which serve to hold the heads —1— and —2— in fixed relation against relative endwise movement.

The lower and upper ends of the tie-rods —3— are reduced to form shoulders —4— which engage the upper and lower faces respectively of the heads —1— and —2— to hold them against relative movement toward each other, the reduced portions of the tie-rods being passed through corresponding openings —5— in said heads and provided with nuts —6— engaging respectively the lower and upper faces of the heads —1— and —2— to hold the latter against vertical movement away from each other.

The lower head —1— is provided with a central pendant cylinder —7— for receiving a vertically movable piston —8—, which is adapted to be moved vertically by fluid under pressure admitted to the cylinder —7— in a manner presently described.

The piston —8— is guided in its vertical movement by a suitable gland —9—, which is secured in the upper end of the cylinder —7— and head —1— to form a liquid tight joint with the piston.

A platen or pressing element 10 is secured to the upper end of the piston 8 above gland 9 and is adapted to cooperate with a relatively fixed platen presently described for compressing the preformed bale or other materials between them.

The piston 8 and platen 10 carried thereby are adapted to be moved upwardly by fluid under pressure admitted to the cylinder through a suitable conduit 11 which may be connected to any available source of water or other liquid supply under the necessary pressure. The passage of the fluid to and from the cylinder is regulated by a valve —12— which in turn is connected by a branch conduit 13 to the interior of the cylinder 7.

The valve 12 is also provided with a branch conduit 13' adapted to receive the exhaust from the cylinder 7 as the piston 8 is moved downwardly under its own weight, said valve being provided with an operating handle 12' adapted when in one position to open communication between conduits 11 and 13 for admitting fluid under pressure to the cylinder 7 and cutting off communication with the exhaust conduit 13' and when in another position to open communication between conduits 13 and 13' for permitting the exhaust of the fluid from the cylinder and simultaneously cutting off communication between the conduits 11 and 13.

The platen 10 is preferably rectangular in top plan and in order that it may maintain a certain position relatively to the opposite platen against turning movement about the axis of the piston 8 it is provided with pendant guide rods 14 which are movable through corresponding apertures 14' in the head 1 of the frame, as shown more clearly in Figure 2.

A floor plate 15 is secured by clamps 15' to the upright tie-rods 3 in a horizontal plane directly above the lower head 1 of the main supporting frame and is provided with a central opening 16 of about the same cross-sectional form and area as the platen 10 for permitting the platen to move vertically therethrough, said plate being adjustable vertically along the tie-rods 3 as may be required to bring it into proper relation to the normal downward position of the platen 10, by simply loosening the clamping members 15' which are re-tightened after such adjustment.

The press is installed so that its upper surface will be flush with the floor and the platen 10 some distance below said surface when the latter is in its extreme downward position so as to form a pocket or socket for receiving the lower end of the pre-formed bale and temporarily holding the latter in an upright position preparatory to further compression, thus permitting the bale to be conveyed to the press on a hand truck and conveniently discharged into said pocket.

The upper head 2 is provided with a pendant cylinder 17 in vertical alinement with the lower cylinder 7 and carrying at its lower end the platen 18 of substantially the same horizontal form and area as the platen 10 and in vertical alinement therewith.

A piston 19 is reciprocally movable in the cylinder 17 and has its upper end extended through a suitable gland 20 in the upper end of said cylinder and upper head 2, and provided with a cross-head 21 in a plane above the upper head.

The fluid under pressure may be supplied from any available source to the interior of the cylinder 17 through a suitable inlet conduit 22 and is controlled by a valve 23 having a branch conduit 24 leading into the interior of the cylinder 17 and additional branch conduit 25 through which the exhaust fluid from the cylinder may pass.

The valve is provided with a suitable operating member 23' which, when in one position, serves to admit fluid under pressure to the interior of the cylinder 17 for raising the piston 19 and cross head 21 carried thereby and to cut off communication between the cylinder and exhaust 25 and when in another position serves to cut off the fluid pressure supply and to connect the cylinder with the exhaust conduit.

The cross-head 21 extends radially from the upper end of the piston 19 equal distances from the axis thereof, and is provided with diametrically opposite tie-rods 26 which extend downwardly therefrom at corresponding sides of the upper head 2 and have their lower ends secured to a lower box-supporting band or cross head 27 to cause the latter to move in unison with the upper cross head 21 and, therefore, with the piston 19.

This cross head 27 is arranged horizontally parallel with and above the floor plate 15 to move in the space between said floor plate and the upper head 2 of the frame and is provided with opposite sets of apertured lugs 28 for receiving the ti-rods 3 which serve as guiding means for the cross-head 27.

This cross-head 27 is provided with a central opening 29 having its upper end of substantially the same cross-sectional form and area as the platens 10 and 18, but its lower end is preferably flared downwardly and outwardly to permit the cross-head to pass easily over and upon the pre-formed bale which may then be resting upon the lower platen 10 within the socket 16.

The cross-head 27 serves as a means for receiving and supporting an upright baling box 30 of substantially rectangular cross-section having its lower end rigidly secured to said cross-head to extend upwardly therefrom a distance slightly above the lower face of the upper platen 18 when the cross-head is in its extreme downward position as shown in Figure 2, the interior form and area of the baling box being made to conform to the platens 10 and 18.

The downward movement of the cross-head 27 and parts carried thereby is limited by stops 31 in the form of clamps which are adjustably secured to the tie-rods 3.

All portions of the walls of the baling box 30 are permanently and rigidly secured to each other and are provided with smooth interiors to permit the free movement of the box relatively to the platen 18 and also to permit the free movement of the platen 10 lengthwise of and within the box.

The walls of the box are preferably made of strong laminated metal reinforced by a plurality, in this instance, two bands 32 secured to the outer surfaces thereof and provided with apertured lugs 33 for receiving the tie-rods 3 and permitting the baling box to move freely lengthwise of and upon said rods as the piston 19 is reciprocated vertically.

It will now be understood that the cylinder 17 and its platen 18 and floor plate 15 are supported upon the frame of the machine in fixed relation to said frame, the distance between the upper surface of the floor plate and lower surface of the platen 18 being somewhat greater than the length or height of the pre-formed bale which is to be further compressed so that when the baling box 30 is elevated the lower end of cross-head 27 will be above the lower face of the platen 18, as shown by dotted lines in Figure 2, thus permitting the pre-formed bale to be readily placed in operative position for further compression with its lower end resting upon the lower platen 10 within the opening 16.

It will also be understood that the piston 19 in the upper cylinder 17 and the baling box 30 carried thereby are movable vertically relatively to the cylinder 17 and its platen 18 and that the lower piston 8 and its platen 10 are movable vertically through the opening 16 toward and from the upper platen 18.

The distance between the lower face of the platen 18 and the lower face of the upper head 2 is somewhat greater than the distance between the lower face of the cross-head 27 and upper edge of the baling box 30 to allow said baling box to move from its lowermost pressing position to a position above the lower face of the platen 18, as shown by dotted lines in Fig. 2, thus affording a clear open space between the floor plate 15 and upper platen for the reception of the pre-formed bale.

The upper face of the platen 10 and the lower face of the platen 18 are provided respectively with transverse grooves or slots 10' and 18' for the reception of binding wires or bands by which the compressed bale may be firmly bound in any well-known manner to hold it in its compressed condition after its removal from the press.

*Operation*

Both of the pistons 8 and 19 and parts carried thereby are adapted to be elevated by fluid under pressure admitted to their respective cylinders 7 and 17, but when the fluid pressure is cut off the weight of those parts is sufficient to return them to their extreme down positions during which time the pressure fluid is exhausted through the corresponding conduits —13'— and —25'—.

When it is desired to further compress a pre-formed bale of pulp or other compressible material, the lower platen 10 is permitted to assume its lowermost position as shown in Figure 2, at which time fluid under pressure is admitted to the cylinder —17— to raise the piston —19— cross head —21— and baling box —30— carried thereby to its extreme upper position or until the lower face of the cross-head —27— is in a plane above the lower face of the upper stationary platen —18—.

The pre-formed bale is then placed by hand or otherwise in an upright position with its lower end resting upon the lower platen —10— within the opening —16— where it is temporarily held with its upper end in a plane below in the lower face of the upper platen —18—.

The valve —23— is then operated to cut off the fluid under pressure to the cylinder —17— and to connect said cylinder with the exhaust —25— whereupon the piston —19— and baling box —30— together with other parts carried by the piston will descend by their own weight to their lowermost positions with the baling box surrounding the bale and its upper end in a plane slightly above the upper platen —18—.

The valve —12— is then adjusted to admit fluid under pressure to the lower cylinder —7— thereby raising the piston —8— and platen —10— carried thereby and causing said platen to compress the bale within the box against the upper platen or pressing element 18 until the material is compressed to its maximum density or into a relatively small compact size as compared with the original size of the bale.

While the platen 10 is still in its uppermost position the baling box is again elevated to its extreme upward position by the admission of the fluid under pressure within the corresponding cylinder 17 thereby exposing the entire bale throughout its height between the pressing elements 10 and 18 and permitting the binding wires or bands to be threaded through the grooves 10' and 18' around the bale and the ends of the binders fastened together in any well-known manner, not necessary to further illustrate or describe.

As soon as the compressed bale is properly bound, the valve 12 will be adjusted to permit the lower platen 10 with the compressed bale thereon to return to its lowermost position.

It will be understood, however, that during this downward return movement of the platen 10 the compressed bale may be displaced from the floor plate as soon as or before it reaches the level of the upper surface of the floor plate 15, thus completing the cycle of operation and leaving the machine ready for a repetition of such operation.

Although I have shown and described two valves as 12 and 23 for controlling the operation of the pressure fluid to and from the cylinders 7 and 17, it is understood that any other means may be employed for this purpose and that various changes may be made in the detail construction of the press, without departing from the spirit of this invention.

What I claim is:—

1. In a baling press, an upright baling box for receiving compressible material, a floor plate below the lower end of the box having an opening in vertical alinement with and of substantially the same cross sectional form and area as that of the interior of the box for receiving and alining a preformed bale with the interior of the box, a lower pressing element movable in said opening and normally below the upper face thereof for supporting said preformed bale in the opening, an upper pressing element alined with the upper end of the box, means for elevating the lower pressing element with the pre-formed bale thereon into the box and against the upper pressing element for compressing the bale, and means for withdrawing the box upwardly from the compressed bale, said box being continuous from end to end and having its sides rigidly united to each other.

2. In a baling press, a fixed plate having an opening for receiving and confining a portion of the material to be baled, a fixed platen in axially spaced relation to said plate and co-axial with said opening, a tubular box movable axially across said space toward and from said plate co-axial with and in telescopic relation to the fixed platen for receiving and confining another portion of the material to be baled, said box having its side walls in fixed relation to each other, an additional platen movable axially in said opening and box for forcing the material from said opening and compressing it in said box against the fixed platen, a fluid-pressure-operated motor co-axial with the opening for moving the box away from the fixed plate, and an additional fluid-pressure-operated motor co-axial with the first named motor for moving the additional platen toward the fixed platen.

3. In a baling press, an upright frame having vertically spaced heads and guide-rods connecting the same, in combination with vertically spaced co-axial cylinders rigidly mounted on said heads and provided with glands in their upper ends, pistons movable in said cylinders and extending through and above their respective glands, a platen secured to the lower end of the upper cylinder, a cross-head secured to the upper end of the upper piston to move therewith, a tubular baling box movable vertically along and upon said guide-rods in telescopic relation to said platen and cylinder and co-axial therewith, tie-rod connections between the cross-head and baling box to cause the latter to move axially with the upper piston, a floor plate mounted on the guide-rods between the lower head and lower end of the baling box and provided with a vertical opening co-axial with said box, a platen on the upper end of the lower piston movable in said opening, and means for introducing fluid under pressure into said cylinders for raising the same, said cylinders being adapted to move downwardly under their own weight.

In witness whereof I have hereunto set my hand this 2nd day of February 1929.

RUFUS E. BOSCHERT.